(12) United States Patent
King, Jr.

(10) Patent No.: US 8,552,876 B2
(45) Date of Patent: Oct. 8, 2013

(54) INTELLIGENT WIRE CONNECTORS

(75) Inventor: Lloyd Herbert King, Jr., Jupiter, FL (US)

(73) Assignee: The Patent Store LLC

( * ) Notice: Subject to any disclaimer, the term of this patent is extended or adjusted under 35 U.S.C. 154(b) by 645 days.

(21) Appl. No.: 12/800,315

(22) Filed: May 13, 2010

(65) Prior Publication Data

US 2010/0295691 A1 Nov. 25, 2010

Related U.S. Application Data

(60) Provisional application No. 61/216,880, filed on May 22, 2009.

(51) Int. Cl.
*G08B 21/00* (2006.01)
*H01R 13/66* (2006.01)
*H01R 4/60* (2006.01)
*H01R 4/64* (2006.01)

(52) U.S. Cl.
USPC .......................................................... 340/635

(58) Field of Classification Search
USPC ............... 340/600–693.12; 439/620.01–625; 174/87
See application file for complete search history.

(56) References Cited

U.S. PATENT DOCUMENTS

| 3,328,690 | A | 6/1967 | Lockie et al. ................. 324/122 |
| 3,343,153 | A | 9/1967 | Waehner ........................ 439/490 |
| 3,954,154 | A * | 5/1976 | Kruppenbach et al. ....... 181/112 |
| 4,052,664 | A | 10/1977 | Pohl ............................... 324/556 |
| 4,152,643 | A | 5/1979 | Schweitzer .................... 324/120 |
| 4,259,545 | A | 3/1981 | Hayden ......................... 174/139 |
| 4,794,331 | A | 12/1988 | Schweitzer .................... 324/133 |
| 4,795,499 | A | 1/1989 | Ridenour ....................... 136/230 |
| 5,003,249 | A | 3/1991 | Bird ............................... 324/122 |
| 5,052,941 | A * | 10/1991 | Hernandez-Marti et al. . 439/194 |
| 5,174,765 | A * | 12/1992 | Williams et al. ................ 439/86 |
| 5,179,253 | A | 1/1993 | Munniksma et al. ........... 174/87 |
| 5,188,542 | A | 2/1993 | Ballman ........................ 439/620 |
| 5,218,965 | A | 6/1993 | Ring |
| 5,256,962 | A | 10/1993 | Munniksma et al. .......... 324/133 |
| 5,637,977 | A * | 6/1997 | Saito et al. ..................... 320/109 |
| 5,677,678 | A | 10/1997 | Schweitzer, Jr. ............... 340/664 |
| 5,801,526 | A | 9/1998 | Horstmann .................... 324/133 |
| 5,818,340 | A | 10/1998 | Yankielun et al. ............. 340/602 |
| 5,922,994 | A | 7/1999 | Robinson, Sr. .................. 174/87 |
| 6,045,405 | A * | 4/2000 | Geltsch et al. ............ 439/620.24 |
| 6,118,249 | A | 9/2000 | Brockman ..................... 320/108 |
| 6,241,534 | B1 * | 6/2001 | Neer et al. .................... 439/76.1 |
| 6,412,977 | B1 | 7/2002 | Black et al. .................... 348/178 |
| 6,576,833 | B2 * | 6/2003 | Covaro et al. ................. 174/359 |
| 6,843,685 | B1 | 1/2005 | Borgstrom et al. ............ 439/606 |
| 6,889,086 | B2 | 5/2005 | Mass et al. ....................... 607/60 |
| 6,899,532 | B2 * | 5/2005 | Eddy et al. .................. 417/410.1 |
| 7,074,064 | B2 * | 7/2006 | Wallace ......................... 439/190 |
| 7,122,742 | B2 * | 10/2006 | King et al. ....................... 174/87 |
| 7,271,719 | B2 | 9/2007 | Ku et al. .................... 340/539.26 |

(Continued)

*Primary Examiner* — Daniel Wu
*Assistant Examiner* — Mohamed Barakat
(74) *Attorney, Agent, or Firm* — Jacobson & Johnson LLC

(57) ABSTRACT

An intelligent wire connector carrying a microprocessor for transmitting information and/or sensing conditions proximate the wire connector wherein information from the microprocessor may be transmitted to a remote location in either a wireless mode or indirectly through an electrical wire, which is secured in the wire connector.

8 Claims, 3 Drawing Sheets

(56) References Cited

U.S. PATENT DOCUMENTS

| | | | |
|---|---|---|---|
| 7,306,489 B2* | 12/2007 | Werthman et al. | 439/620.01 |
| 7,374,460 B1* | 5/2008 | Hariharesan et al. | 439/679 |
| 7,400,250 B2 | 7/2008 | Kansala et al. | 340/572.1 |
| 2004/0082866 A1 | 4/2004 | Mott | |
| 2006/0019512 A1 | 1/2006 | Kent | |
| 2006/0180336 A1* | 8/2006 | King et al. | 174/87 |
| 2008/0254664 A1 | 10/2008 | Hiner | 439/283 |

* cited by examiner

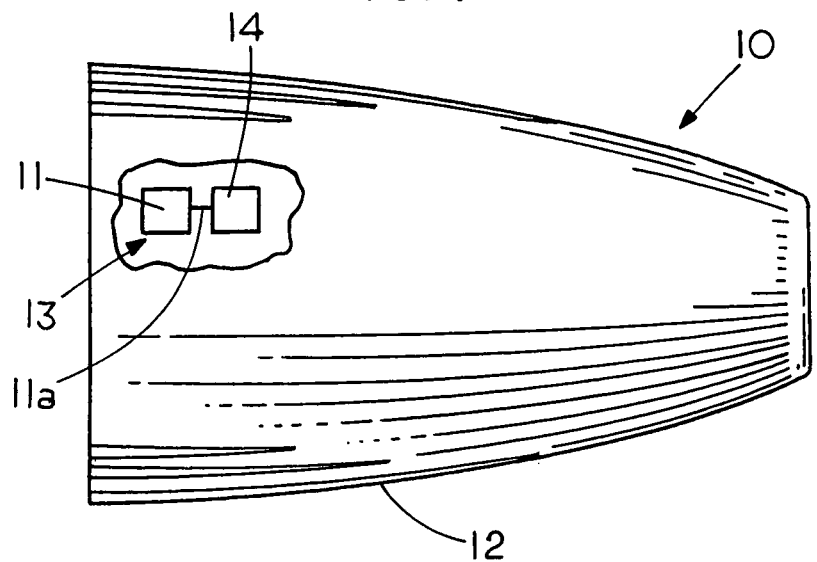
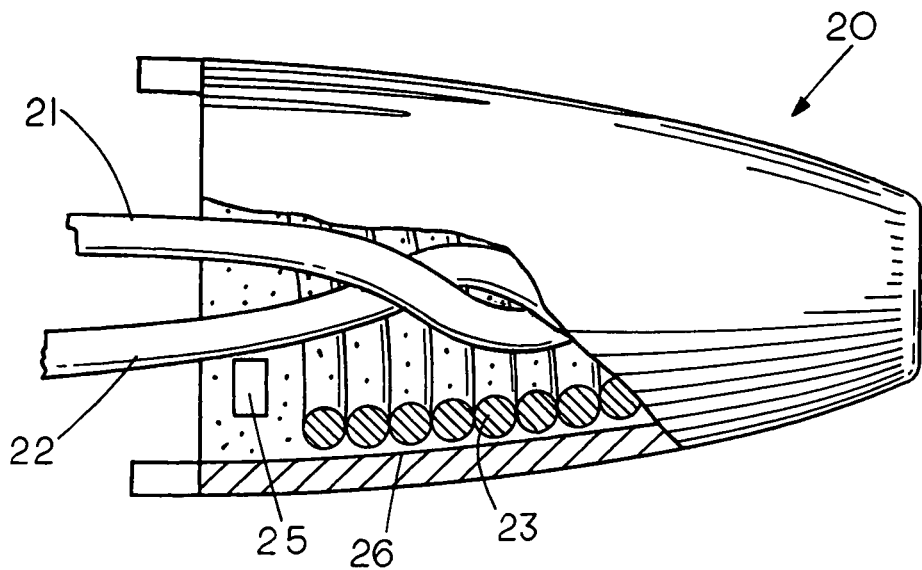

INTELLIGENT WIRE CONNECTORS

CROSS REFERENCE TO RELATED APPLICATIONS

This application claims priority from provisional application Ser. No. 61/216,880 filed May 22, 2009.

FIELD OF THE INVENTION

This invention relates generally to wire connectors and, more specifically, to intelligent wire connectors incorporating a microprocessor to provide dynamic information such as a status of an electrical circuit or environmental conditions proximate the wire connector.

STATEMENT REGARDING FEDERALLY SPONSORED RESEARCH OR DEVELOPMENT

None

REFERENCE TO A MICROFICHE APPENDIX

None

BACKGROUND OF THE INVENTION

Different types of wire connectors are known in the art, one type of electrical connector is a terminal lug connector, which is typically secured to an end of a single electrical wire by crimping or soldering the wire to the lug connector. These types of wire connectors, which are attached to the end of a single wire usually have a hole therein so the lug can be attached to a bus bar or the like by a threaded fastener. These types of terminal lug connectors are usually not electrically isolated from their surroundings.

Another type of electrical wire connector is the type used to join two or more wires into an electrical connection. A well-known and popular example of a wire connector to join two or more wires is the twist-on wire connector. Typically, when two or more wires are electrically joined in a twist-on wire connector the wire connector simultaneously forms an electrical wire junction and electrically insulates the wire junction from the surroundings as the connector housing is twisted with respect to the wires therein. These types of twist-on wire connector are usually concealed from view by a junction box or in some cases by burying the wire connector underground.

When electrical problems occur in an electrical circuit the problem often times occur in or proximate an electrically insulated wire connector. If a fault arises in a twist-on wire connector such as a faulty electrical junction all the twist-on wire connectors may have to be found and inspected since the twist-on wire connectors are oftentimes concealed from view within junction boxes or the like. Aside from locating a fault in an electrical circuit there are also environmental conditions that may lead to faults, for example, if the temperature in the twist-on wire connector increases or changes rapidly it may be a preliminary indication that an electrical junction between the wires is about to fail. This is particularly true in electrical twist-on wire connectors where the electrical wires are held in pressure contact by a member within the housing of the wire connector.

In other cases one may want to monitor environmental conditions proximate a wire connector as such conditions may indicate that either the junction between the wires is about to fail or equipment connected to the electrical circuit is about to fail which may change environmental conditions proximate the wire connector. Typical environmental conditions that may be indication of a problem include excessive moisture, extreme temperature and in some cases excessive or inadequate pressure.

In still other cases one may want to monitor environmental conditions proximate an electrical circuit for purposes not related to the operation of the electrical circuit.

Electrical wire connectors for joining two or more wires, such as twist-on wire connectors, are usually concealed in junction boxes or behind walls or even underground. The concealment of the electrical wire connector makes it time consuming to locate an electrical connector with a faulty electrical junction. In still other cases the wire connectors may be visible but the problem is not immediately apparent since the electrical junction within a wire connector is shielded from view by the insulated housing or shell on the exterior of the wire connector.

Microprocessor animal implants, which contain passive RFID tags, are known in the art and have been used to contain static information on the animal carrying the implant or the owner of the animal. Similarly, passive RFID tags have been attached to products shipped in commerce for purpose of inventory tracking and inventory management. Typically, in animals such as pets a passive RFID tag may be implanted in the ear of the pet with the passive RFID tag containing static information on the owner as well as static information on the health of the animal. Through use of an external RFID reader the information can be downloaded from the passive RFID tag to help locate information on the owner of a lost pet or to determine if the pet has received the proper immunizations. In other cases the passive RFID tag may be used for inventory tracking and management by attaching the passive RFID tags directly to containers or goods to enable tracking of the containers or the goods which can be used to improve the efficiency of the inventory management of the goods as the goods are shipped from manufacture to a retail or commercial outlet. In either case through use of a RFID reader one can quickly determine useful static information related to the animal or goods associated with the passive RFID tag. Typically, the passive RFID tag contains a microprocessor for processing information and an antenna for receiving and transmitting information. Some types of passive RFID tags contain batteries while others do not. Typically, passive RFID tags operate in the radio frequency which ranges from 3K Hz to 300 GHz.

U.S. Pat. No. 7,306,489 discloses a heat sensitive coating on a terminal lug. The heat sensitive coating, which is placed on a portion of the electrically conducting region of the terminal lug, either changes color or melts in response to a change in temperature of the terminal lug. Typically, terminal lugs have a tubular end that is secured to an end of a wire by inserting the wire end therein and either crimping the tubular end to the wire end or soldering the wire end to the tubular end of the terminal lug. To protect a heat sensitive coating on the terminal lug from environmental conditions, which are external to the terminal lug, the inventor places a thermal shield over the heat sensitive coating. In one of his examples the performance indicator, which is a color changing paint, is applied to a terminal lug, which when crimped, retains enough of the performance indicator to provide a visual indication of the color change. In another example the heat sensitive coating is applied to the housing of his terminal lug. In alternate embodiments the inventor adhesively adheres a passive RFID tag, which may contain a sensor such as pressure sensor, a strain sensor, a temperature sensor or a humidity sensor, on his terminal lug. In another example multiple passive RFID tags are placed on his terminal lug with the incoming radio frequency signal used to power the passive RFID tag to enable the RFID tag to transmit information to an RFID reader.

SUMMARY OF THE INVENTION

Briefly, the invention comprises an intelligent wire connector having a microprocessor or microchip carried by the wire connector which enables one to simultaneously form an electrical wire junction proximate an environmental sensor and transmitter which is carried by the wire connector. In one example the microprocessor includes the transmitter and the microprocessor may comprise either an active or passive microprocessor to provide either on-the-go environmental information or static information or both to a remote location through wireless transmission from a transmitter in the microprocessor. In another example of the invention the electrical wires joined in the wire connector may be used to indirectly communicate with the microprocessor. In another example of the invention the microprocessor in the wire connector may incorporate a plurality of sensors to provide on-the-go information on the environmental conditions proximate the wire connector such as temperature, moisture and pressure proximate the wire connector which may be monitored to provide an indication of a failure or impending failure of an electrical circuit or an impending failure of a component connected to the electrical connector. The microprocessor may include a location sensor to determine if the electrical system has been tampered with. The microprocessor may also include static information or identifying information that one may want to access when the electrical circuit is changed. By incorporating the microprocessor into an insulated wire connector housing one provides a method of forming a wire connection one to simultaneously includes the placement of the microprocessors throughout the electrical system without any installation expense since the wire connectors with the microprocessors are installed when the electrical circuit is wired with the electrical wire connectors. A further benefit of use of the microprocessor with the wire connector is that microprocessor can be concealed and protected within the electrically insulated housing of the wire connector. While passive microprocessor may be powered by an incoming radio frequency signal a feature of the present invention is the microprocessor may be inductively powered by tapping energy from an ac current carried by the wires joined in the wire connector thus providing information on an environmental condition proximate the connector whenever a current is carried by the wire connector.

BRIEF DESCRIPTION OF THE DRAWINGS

FIG. 1 is a partial sectional view of a twist-on wire connector with a microprocessor embedded in the insulated housing of the twist-on wire connector;

FIG. 2 is a partial section view of the twist-on wire connector of FIG. 1;

DESCRIPTION OF THE PREFERRED EMBODIMENT

Figure 3:
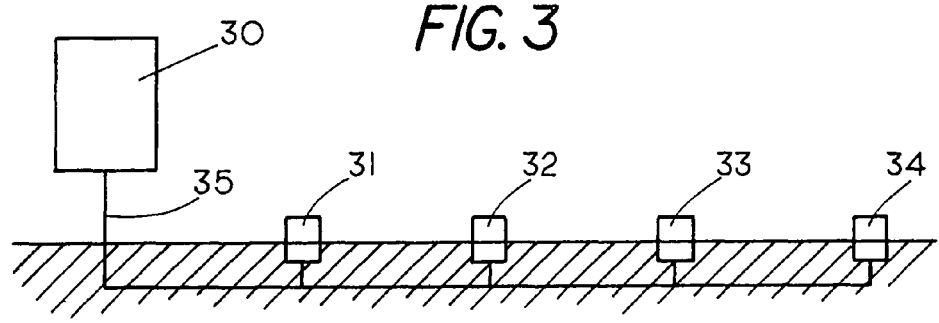
FIG. 3 is a schematic of an irrigation system with the invention.

FIG. 1 is a partial sectional view of an intelligent wire connector such as twist-on wire connector 10 carrying a microprocessor or microchip 11 with the microprocessor embedded in the electrically insulated housing 12 of the twist-on wire connector so as not to interfere with the grasping or manipulation of the twist-on wire connector during the joining of the ends of electrical wires in the hollow interior of the twist-on wire connector. Twist-on wire connectors perform multiple functions in that they can simultaneously join wires into electrical contact with each other while they electrically insulate the joined wires from the surrounding environment. While the microprocessor is shown embedded in the electrically insulated housing, in some applications one may want to have the microprocessor in a more prominent position even though it may interfere with the joining of electrical wires in the twist-on wire connector. In the invention described herein the twist-on electrical wire connector housing becomes a carrier for the microprocessor with the operation of the twist-on wire connector and the microprocessor independent of each other since the electrical twist-on wire connector is a passive carrier for the microprocessor. A benefit of placing the microprocessor on the electrically insulated housing in that electrically insulated housing can provide both thermal and electrical protection for the microprocessor since the microprocessor does not need to be placed directly on a current carrying wire or terminal. Typically, in a passive system an RFID tag is powered by an incoming radio frequency signal to enable the RFID tag to transmit information back to an RFID reader. A feature of the invention described herein is that one can tap a portion of the energy in the available electrical field proximate the joined wires in the wire connector to power the microprocessor or a sensor or both which may be mounted on the twist-on wire connector. Thus a benefit of the system described herein is it permits information from the microprocessor to be transmitted either periodically, continually or in response to a signal external to the electrical wire with or without power from an RFID reader or the like. By placing the microprocessor on or in the twist-on wire connector the independent functions of each may be joined to provide a user with information not normally available. For example, the placement of sensors, which may be used to monitor conditions proximate connector can be used to provide information periodically or continually to a location remote from the twist-on wire connector. In contrast static information which is programmed into tags to provide information on owners or information on the presence of articles the invention described herein a benefit of the invention described herein is that one can obtain and transmit dynamic information or on-the-go information which may include the status of the electrical junction within the wire connector as well as information on environmental conditions proximate the wire connector since the generation of information is not dependent on first sending an rf signal to the microprocessor to elicit a response. By dynamic information it is understood that the information has not been programmed into the microprocessor but is information that becomes available because of current or changing conditions proximate the wire sensor or from the presence of the twist-on wire connector. For example, the types of dynamic information may include the physical location of a specific twist-on electrical wire connector that it is hidden by a wall as well as the status of the electrical wire junction in the twist-on wire connector. A further feature of the invention is that the use of the twist-on wire connector with the microprocessor allows one to quickly locate a wire connector that has failed or a failed device which is joined by the wire connector.

A benefit of placing the microprocessor and or sensors in the twist-on wire connector is that one eliminates the need for mounting separate sensors, which may be costly. In addition one can eliminate cumbersome and costly separate independent control circuits. A further benefit is that the sensors or microprocessors need not be separately secured to an end of an electrical wire.

A further benefit of the invention is the inexpensive placement of the microprocessor and or sensor in a system. That is, the wire connector provides an inexpensive method of placing sensors and backup sensors in an electrical circuit since the simultaneously placement of sensors occurs with the attachment of an electrical wire to a twist-on wire connector.

A twist-on wire connector has been found to be ideally suited for carrying a microprocessor or microprocessor and sensor is the twist-on wire connector since the twist-on wire connectors are extensively used in home and business premises although it is envisioned that the invention described herein may be used with other types of wire connectors which contain an electrically insulated housing for joining electrical wires to each other while insulating the electrical wires from the surrounding environment.

Typically, the twist-on electrical connector 10 includes a dome shaped electrically insulating housing 12 for grasping by the user and an internal member, such as a spiral metal coil, for twistingly engaging electrical wires to form an electrical connection therebetween as the bared ends of wires are twisted into electrical engagement with each other through a twisting action on the wire connector with respect to the electrical wires. Although a twist-on wire connector with a microprocessor is shown it will be understood that other types of electrical wire connectors, which use a different wire engaging member to join electrical wires, may be used to carry a microprocessor, transmitter and or sensor without departing from the spirit and scope of the invention described herein.

Referring to the partial section view of twist-on wire connector 10 of FIG. 1, there is shown an information device 13 which may be a microprocessor that is capable of transmitting information continually, intermittently or on demand. The information device 13 may also be capable of generating and transmitting information, for example information device 13 may includes a microprocessor 11 and a separate sensor 14 connected to the microprocessor through electrical lead 11a. Sensor 14 may be an environmental sensor for measuring environmental conditions such as temperature, pressure, moisture as well as the content of the liquids or gases that are proximate the wire connector. It should be understood that non-environmental sensors, for example location sensors, may be used with the microprocessor 11. In addition, one or more types of sensors may be incorporated into a single microprocessor. It should be appreciated that the intelligent wire connector described herein may be used with a variety of different types of sensors without departing from the spirit and scope of the invention described herein. It may also be appreciated that a sensor may be integral part of the microprocessor as opposed to being separate from the microprocessor.

To provide for transmission of information from the sensors in the microprocessor 11 as well as remote monitoring of information proximate the sensor one may incorporate wireless transmission capability into the wire connector. For example, one may use conventional radio frequency identification (RFID) technology which can be activated remotely by an RFID reader. Although a passive dynamic information transmission is illustrated in some applications one may wish to use an interactive technology. It is envisioned other technology such as nano arrays may be used to provide miniaturized systems. In the systems described herein one may use either an active microprocessor that continually or periodically transmits information or a passive microprocessor that transmits information when an interrogation signal is sent or combinations of both types of microprocessors. In addition, one may use two or more microprocessors in the same wire connector either for purposes of redundancy or for providing additional information.

It should be understood that the sensors or transmitters for relaying the information from a sensor to a remote location may be separate components that are controlled by the microprocessor or they may be integral components of microprocessor.

The positioning of the microprocessor and or sensor may provide benefits. Placing the sensor or microprocessor on the exterior of the housing enables one to sense environmental conditions proximate the exterior of the wire connector while placing the sensor or microprocessor on the inside of the wire connector may allow one to provide information about conditions in the interior of the wire connector including the condition of the electrical wires joined in the electrical wire connector, for example the presence of moisture or the temperature proximate the twist-on wire connector which may indicated a potential for failure of equipment proximate the wire connector. Similarly, one may place sensors in two or more locations while the microprocessor may be located in another position on or in the wire connector. Other examples of sensors useable with the invention described herein may include location sensors, data sensors, conductivity sensors, motion sensors, chemical sensors, disruption sensors or radioactivity sensors. It will be envisioned that other types of sensors may be used with the invention described herein without departing from the spirit and scope of the invention.

Information obtained from a sensor can be transmitted from the microprocessor to a remote site either on demand or upon occurrence of an event. In some instance information from the sensors may be used to activate an alarm either on the wire connector or proximate the wire connector. The alarm may be visual or audible and transmission from the microprocessor may include voice transmissions. In other applications data transmissions or video transmissions can be sent to a remote recover. By a remote recover it is meant a receiver that is not proximate the wire connector but is within a range that communications can be received from the microprocessor in the wire connector. In addition the microprocessor may be programmed with software to provide the needed information.

FIG. 2 is a partial section view of the twist-on wire connector 10 of FIG. 1 revealing a spiral core 23, which is located in a cavity 24 in the twist-on wire connector 20. The spiral core is known in the art and is frequently used to join wires into an electrical connection without the aid of tools and is usually formed of a rigid metal that comprises an electrical conductor. FIG. 2 shows the presence of the information device 25 which includes a microprocessor at the base or open end of the wire connector 20 although it should be understood the microprocessor may be located in other positions on the wire connector 20 some of which may be determined by the type and purpose of the sensor.

FIG. 2 shows a pair of wires 21 and 22 in connector 20 that are held in electrical contact through pressure engagement with spiral coil 23. In this embodiment the information device 25 is located on the interior of the twist-on wire connector and may include an integral sensor. The location of the microprocessor in the interior of the wire connector 20 enable a sensor in the information device 25 to sense or measure environmental conditions such as temperature, or moisture within the electrical connector, which may be an indication of failure of the junction between electrical wires.

For example, in circuits that may join both aluminum and copper wires, which are known to occasionally fail and cause fires, the detection of heat at the junction between the wires may be an indication that the junction within the wire connector is about to fail. The information device 25 may includes RFID technology or other wireless technology or direct wire transmission technology to permit remote accessing of information from the microprocessor. In one example of the invention information about the information device 25 or information that may be sensed by a sensor which is in or integral to the microprocessor can be accessed by a device such as a wireless receiver, which is located remote from the wire connector carrying the microprocessor. In another example information may be piggybacked on the electrical wires joined in the wire connector by using a carrier voltage and frequency that does not interfere with the normal operation of the electrical circuit formed by the electrical wires joined in the wire connector. Both the sensor and the microprocessor may be incorporated into a single chip which can be installed in or on the wire connector. Twist-on wire connector 20 is shown with a waterproof sealant 26 therein. One may also use the inventions described herein if the wire connector is devoid of any sealant. For example, in some cases one may place a sealant in the twist-on wire connector for purposes of waterproofing the electrical junction formed in the twist-on wire connector while in other cases no sealant may be used. Use of a viscous sealant to waterproof the junction in a twist-on wire connector is shown and described in King U.S. Pat. Nos. 5,151,239; 5,113,037; 5,023,402 and Re 37,340 which show a twist-on wire connector that allows on-the-go formation of a sealant covered electrical connection therein.

The use of a moisture sensor, which may be separate or integral to microprocessor, in the wire connector 20 allows one to sense when water or moisture is present the wire connector 20, for example in the case of a leak or flood proximate the wire connector. Other use for a moisture sensor is in irrigation systems where the sensor may be used to determine if an area has received sufficient moisture during the irrigation of the area. In such applications the sensor may be located on an external surface of the twist-on wire connector. A feature of the invention that can be appreciated by installers is that no additional wires are needed to be installed in order to transmit information from the wire connector 20 to a location remote from the wire connector. Similarly, since the microprocessor can be attached or formed to the wire connector housing during the manufacture of the wire connector no field labor is needed to install the sensors and the microprocessor.

In some examples sensing functions can be integrated with other functions. For example integration of a position sensor and a temperature sensor in the microprocessor would allow one to transmit information regarding the temperature at a specific location so that corrective action could be taken if the temperature is outside a permissible range of temperatures as well as to alert one to the location of a problem.

Anther example of use of the connector with a microprocessor is in commercial facilities such as manufacturing facility where an environmental sensor such as a chemical sensor and location sensor are included in the same wire connector to enable the microprocessor to transmit information on the existence of a chemical leak as well as the position of the chemical leak. Position sensors such as GPS sensors may be useable with connectors that are located in unshielded areas and in some instance sensors may be located indoors. In those sensors the location of the sensors may be determined by information carried by the microprocessor as well as the strength of an electromagnetic field proximate the sensor. For example, if each of the microprocessor in the wire connectors were programmed with a different identifier location the location of a fault could be determined by the position of the microprocessor.

Another example of the use of wire connectors and particular wire connectors with microprocessors is in irrigation systems including golf course irrigations systems. The microprocessor carried by the connector could monitor line transmission information to sprinkler controls to determine if the irrigation signal sent from a controller was reaching the proper irrigation units. The moisture sensor could confirm that the system is operating properly by determining if moisture is present proximate the wire connectors.

FIG. 3 shows a schematic of an irrigation system with a controller 30 with an electrical wire 35 which is connected to electrically operated valves 31, 32, 33 and 34 each of which are connected to electrical wire 35 through the intelligent connector 10 of FIG. 1, although the intelligent connector 20 shown in FIG. 2 may also be used, if desired. In this application a number of monitor actions can be performed. For example, one can independently monitor the signal arriving at the valves to determine if the signal sent from controller 30 has reached the valve. Other information that could be independently monitored is the delivery of water to a zone or an irrigation system. For example if one of the valves receives a control signal from the controller and malfunctions which causes the valve to delivers either to little water or to much water a moisture sensor in a intelligent connector can transmit information on the problem independent of the control signal to thereby let a user know that one or more of the electrically operated valves have failed.

Other uses include incorporating a motion detector in the intelligent connector. In the use of motion sensor with the microprocessor one can determine if either the electrical connection in the wire connector or the equipment proximate the microprocessor was being tampered with by monitoring motion proximate the microprocessor. Once motion is detected a signal can be sent to activate an alarm to provide information on any tampering as well as the location of the tampering.

Figure 4:
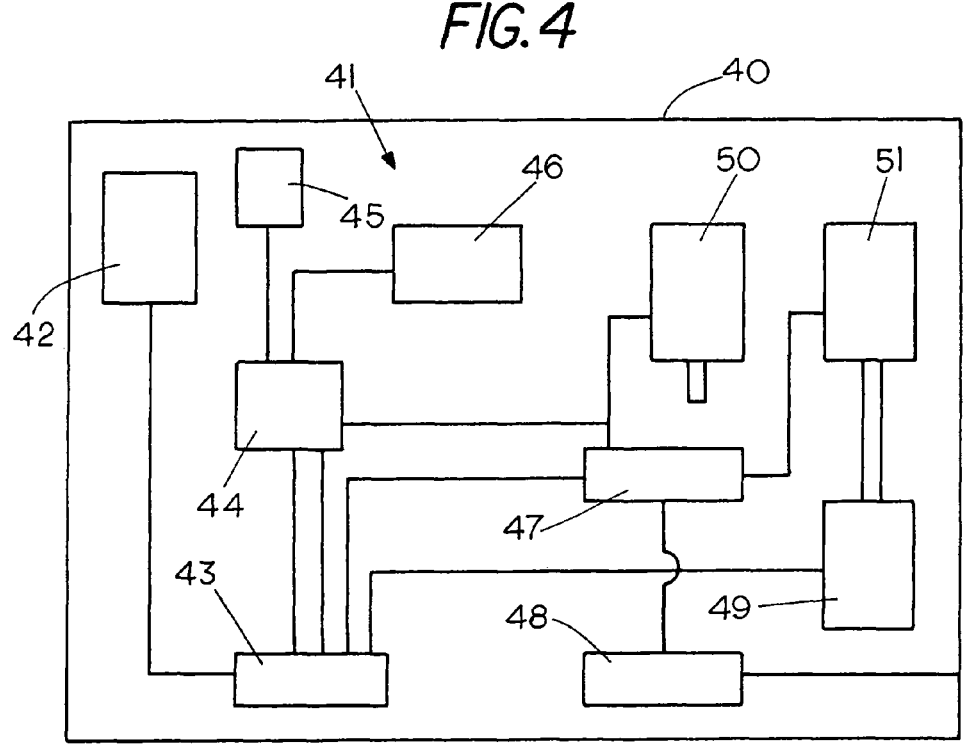
FIG. 4 is a schematic of a building wiring circuit using the invention.

FIG. 4 shows an example of another use of the intelligent connector described herein in conjunction with an electrical wiring system of a building. FIG. 4 shows a building wall 40 with an electrical circuit 41 where the electrical circuit is located behind a wall 40. In the electrical circuit 41 the power supply 42 delivers power to electrical junction boxes 43-51 which may be coupled directly to equipment such as motors, heaters, relays or other electrical devices. Each of the junction boxes contains one or more intelligent connectors and a sensor. For example, the junction boxes may contain multiple sensors such as motion sensors, temperature sensors, pressure sensors or moisture sensors. A motion sensor in the electrical circuit could determine circuit tampering and a temperature sensor could alert one to hazardous conditions due to heat and a moisture sensors could alert one to a moisture problem behind the wall.

In addition to use of wireless transmission it is envisioned that the circuit that the wire connectors may be joined with other systems to carry signals to a remote location, for example, through the Internet or to a cellular infrastructure including "push to talk" or IP protocol for internet access.

Figure 5:
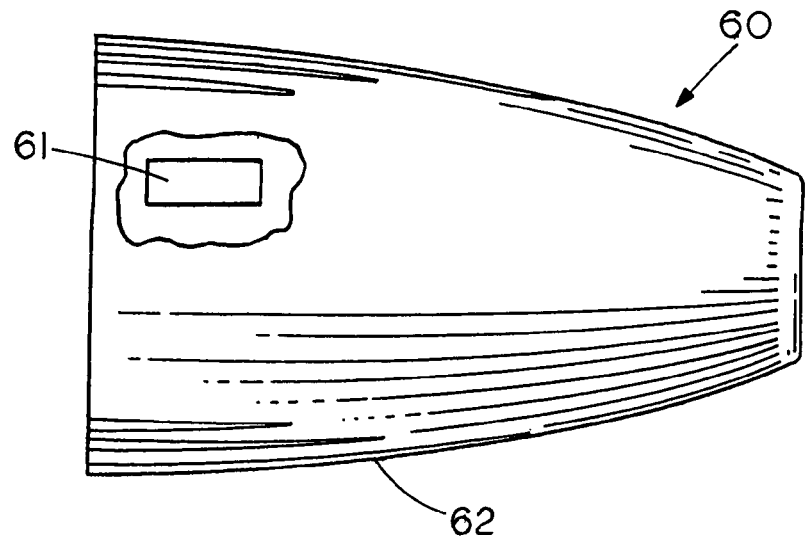
FIG. 5 is a partial section view of a twist-on wire connector including a charging unit.

FIG. 5 shows a cross sectional view of a twist-on wire connector 60 revealing an information device 61 incorporated into the electrically insulated housing of a twist-on wire connector to shield the microprocessor from the internal ac or dc current by the twist-on wire connector. In the example shown in FIG. 5 the power for operating the microprocessor can be tapped from the electrical wires joined in the twist-on wire connector even though the wires joined in the connector are physically isolated from the microprocessor by the insulated housing. This type of device is well suited for locations where power may be required to be supplied to the microprocessor to extend the operating life or transmission range of the microprocessor. Typically, in most household and business applications twist-on wire connectors are used to connect electrical wires carrying a 60-hertz current. Since the wires carrying the 60-hertz current are joined in the electrical connector the invention described herein allows one to use the electromagnetic field from alternating current, which is carried by the electrical wires in the twist-on wire connector, to inductively charge a battery for operating a microprocessor or a sensor. Connector 60 may be a waterproof wire connector which includes a waterproof sealant located in the hollow of the wire connector 60.

Figure 6:
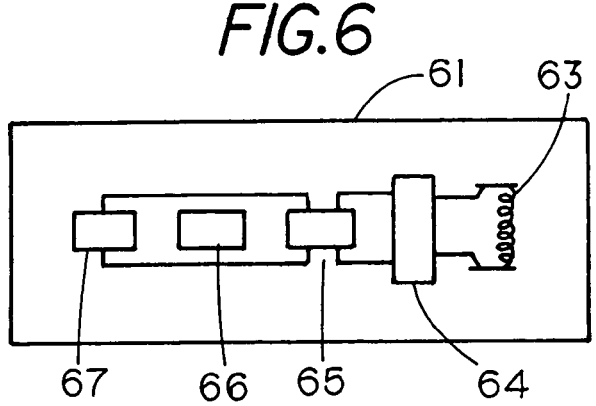
FIG. 6 is a schematic view of a sensor and microprocessor.

FIG. 6 illustrates an example of an information device 61 comprising an inductively powered microprocessor 66 having a dc battery charging system 64 where information device 61 includes an elongated looped inductive coil 63 that can be excited by an ac signal such as a 60 hertz signal carried by the electrical wires joined in the wire connector 60. The looped coil is an electrical conductor of the type that a current can be induced therein when the looped coil is subject to a varying electromagnetic field from another source. The use of looped coil 63 and the varying electromagnetic field generated by the electrical wires, which are joined in the twist-on wire connector, allows one to inductively transfer power to the microprocessor or to a sensor. In operation the looped coil 63, which is excited by the changing electromagnetic field generated by the wires in wire connector 60, sends an electrical signal to a charger 64, which may include diodes, for charging battery 65. Battery 65 supplies power to microprocessor 66 and to a sensor 67. In this type of system the microprocessor 66 and sensor 67 can be powered by a battery 65 which is charged when the alternating current is present in the twist-on wire connector. This type of system is also useful where the alternating current may no longer be present in the twist-on wire connector, i.e., due to a power failure, since the battery can continue to power the sensor and the microprocessor even though no external power is being supplied to the microprocessor. While the looped coil may be used to power the microprocessor and or sensor the looped coil may also be used as a sensor to detect the presence of changes in the electromagnetic field in the wire connector.

Figure 7:
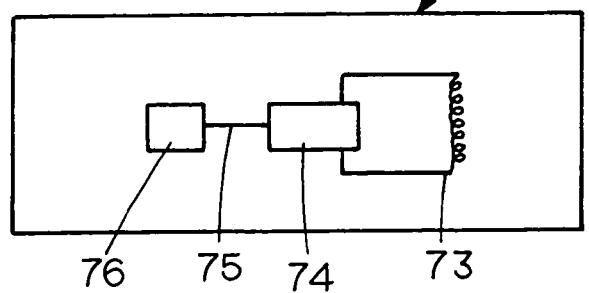
FIG. 7 is a schematic view of an alternate embodiment of a microprocessor and sensor.

FIG. 7 illustrates an alternate embodiment of an information device 71 wherein which includes an ac-powered microprocessor 74 therein that receives power through an elongated looped coil 73. Microprocessor communications with sensor 76 through a lead 75. Thus in some cases sensor 76 power for the microprocessor can be supplied directly from a coil 73 the microprocessor 74 which operates or controls the sensor 76.

While a single microprocessor is shown it should be understood that one or more microprocessor may be incorporated into the electrical wire connector. Likewise one or more sensors may be used with each of the microprocessors.

While the use of RFID technology or other wireless transmission technology may be used for the transmission of information from the microprocessor in the electrical wire connector to a remote location it also envisioned that one may transmit information indirectly. By indirect transmission it understood to include the use an existing wire extending into the electrical wire connector as a secondary carrier by sending a different frequency or voltage from the primary power carried by the electrical wire joined in the wire connector over the electrical wires. The use of a different type of signal from the primary power carried by the wires enables one to indirectly transmit information back and forth over the electrical wires or the surface of the electrical wires without adversely affecting the transmission of the primary power directed through the electrical wires joined in the electrical wire connectors. Indirect transfer may be beneficial in those circuits where the circuits are shielded or isolated so as to inhibit or prevent the presence of wireless transmissions.

One of the features of the wire connectors described herein is that a number of different types of sensors may be incorporated into different sets of wire connectors. For example, one set of wire connectors may have a microprocessor and a moisture sensor, while another set of wire connectors includes a microprocessor and temperature sensor while still other sets of wire connectors may have a location sensor. When constructing a building or other circuit system using the wire connectors with the microprocessor the invention described herein provides the user with the option of intermingling different types of sensors in the same circuit including in some cases connectors that contain no microprocessors, for example if multiple sensors would generate excess redundancy. Thus a system may be built to transmit a variety of different types of information to a remote location including both static and dynamic information.

Thus in one example of the invention described herein a microprocessor, which is carried by a housing, may be responsive to a condition proximate the electrical wire connector with the microprocessor operable for transmitting information to a location remote from the electrical wire connector either periodically, continually or in response to a signal external to the electrical wire connector. The condition proximate the electrical wire connector may be the result of either environmental information, non-environmental information or both although other types of dynamic or static information are within the scope of the invention described herein.

Thus the invention includes a method of remotely obtaining dynamic information proximate an electrical wire connector by placing a microprocessor in a wire connector; forming an electrical junction in the wire connector; placing the wire connector with the microprocessor in an area where the wire connector may be concealed from view; sensing conditions proximate the wire connector to obtain dynamic information; and using the microprocessor to transmit the dynamic information to a remote location.

I claim:

1. An twist-on wire connector for joining electrical wires into an electrical connection therein comprising:
    an electrically insulated housing having a closed end and an open end;
    a spiral coil for maintaining an electrical wire in electrical contact within the insulated housing; and
    an information device comprising a microprocessor carried by said twist-on wire connector, said microprocessor having a transmitter operable to transmit dynamic information generated by a sensor to a location remote from the twist-on wire connector either periodically, continually or in response to a signal external to the twist-on wire connector, said sensor is integral to the microprocessor and the transmitter is a wireless transmitter;

a looped coil for inductively powering the microprocessor from an internal ac current carried by the electrical wire secured in the twist-on wire connector wherein the microprocessor is shielded from the internal ac current by the electrically insulated housing of said twist-on wire connector.

2. The twist-on wire connector of claim 1 wherein the twist-on wire connector includes the looped coil for inductively powering the microprocessor from an internal ac current carried by the electrical wire secured in the twist-on wire connector.

3. The twist-on wire connector of claim 2 wherein the sensor is integral to the microprocessor and the transmitter is a wireless transmitter.

4. The twist-on wire connector of claim 1 wherein the sensor comprises one or more of a moisture sensor, a pressure sensor, a location sensor or a temperature sensor.

5. The twist-on wire connector of claim 1 wherein the twist-on wire connector includes, a battery, a battery charger and the looped coil for inductively receiving energy from an electromagnetic field generated by electrical wire present in the twist-on wire connector.

6. The twist-on wire connector of claim 1 wherein the microprocessor carried by said electrical wire connector is embedded in the electrically insulated housing of said twist-on wire connector and the microprocessor includes information on a wire connector location and a wire connector identity.

7. The twist-on wire connector of claim 1 wherein the microprocessor includes an environmental sensor and either an active microprocessor or a passive microprocessor.

8. The twist-on wire connector of claim 1, said twist-on wire connector located in either an irrigation system electrical circuit or a building system electrical circuit, said twist-on wire connector joining ends of electrical wires therein with the twist-on wire connector including an environmental sensor; and said microprocessor embedded in the insulated electrical housing with the environmental sensor exposed to an external environment of the twist-on wire connector.

* * * * *